US012223183B2

(12) United States Patent
Golden et al.

(10) Patent No.: US 12,223,183 B2
(45) Date of Patent: *Feb. 11, 2025

(54) COMBINING MEMORY ALIGNED OPERATIONS

(71) Applicant: PURE STORAGE, INC., Santa Clara, CA (US)

(72) Inventors: Christopher Golden, Emerald Hills, CA (US); Scott Smith, San Mateo, CA (US); Luke Paulsen, Mountain View, CA (US); David Grunwald, San Francisco, CA (US); Jianting Cao, Mountain View, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,045

(22) Filed: Dec. 4, 2023

(65) Prior Publication Data
US 2024/0231643 A1  Jul. 11, 2024

Related U.S. Application Data

(63) Continuation of application No. 17/731,657, filed on Apr. 28, 2022, now Pat. No. 11,836,357, which is a continuation of application No. 17/160,938, filed on Jan. 28, 2021, now Pat. No. 11,422,714, which is a continuation of application No. 16/294,019, filed on Mar. 6, 2019, now Pat. No. 10,956,054, which is a continuation of application No. 15/499,068, filed on Apr. 27, 2017, now Pat. No. 10,268,403, which is a continuation of application No. 14/926,162, filed on Oct. 29, 2015, now Pat. No. 9,740,414.

(51) Int. Cl.
*G06F 13/00* (2006.01)
*G06F 3/06* (2006.01)

(52) U.S. Cl.
CPC ............ *G06F 3/0619* (2013.01); *G06F 3/061* (2013.01); *G06F 3/065* (2013.01); *G06F 3/0659* (2013.01); *G06F 3/0665* (2013.01); *G06F 3/067* (2013.01); *G06F 3/0683* (2013.01); *G06F 3/0688* (2013.01); *G06F 3/0689* (2013.01)

(58) Field of Classification Search
CPC ............ G06F 12/1009; G06F 12/1027; G06F 2212/657; G06F 2212/68
See application file for complete search history.

(56) References Cited

U.S. PATENT DOCUMENTS 7,975,115 B2  7/2011  Wayda et al.
8,504,797 B2  8/2013  Mimatsu
(Continued)

OTHER PUBLICATIONS

Hwang K., et al., "RAID-x: A New Distributed Disk Array for I/O-Centric Cluster Computing," Proceedings of The Ninth International Symposium On High-performance Distributed Computing, IEEE Computer Society, Los Alamitos, CA, Aug. 2000, pp. 279-286.

(Continued)

*Primary Examiner* — Yong J Choe

(57) ABSTRACT

Optimizing copy operations in a storage array, includes combining, in dependence upon a metadata optimization policy, a plurality of copy operations into a single copy operation and splitting the single copy operation into an optimized set of executable copy operations that copy data based on memory alignment.

20 Claims, 5 Drawing Sheets

(56) References Cited

U.S. PATENT DOCUMENTS

| | | |
|---|---|---|
| 8,822,155 B2 | 9/2014 | Sukumar et al. |
| 9,280,678 B2 | 3/2016 | Redberg |
| 9,395,922 B2 | 7/2016 | Nishikido et al. |
| 10,324,639 B2 | 6/2019 | Seo |
| 10,567,406 B2 | 2/2020 | Astigarraga et al. |
| 10,846,137 B2 | 11/2020 | Vallala et al. |
| 10,877,683 B2 | 12/2020 | Wu et al. |
| 11,076,509 B2 | 7/2021 | Alissa et al. |
| 11,106,810 B2 | 8/2021 | Natanzon et al. |
| 11,194,707 B2 | 12/2021 | Stalzer |
| 2008/0256141 A1 | 10/2008 | Wayda et al. |
| 2010/0306500 A1 | 12/2010 | Mimatsu |
| 2011/0035540 A1 | 2/2011 | Fitzgerald et al. |
| 2014/0220561 A1 | 8/2014 | Sukumar et al. |
| 2015/0154418 A1 | 6/2015 | Redberg |
| 2016/0026397 A1 | 1/2016 | Nishikido et al. |
| 2016/0182542 A1 | 6/2016 | Staniford |
| 2016/0248631 A1 | 8/2016 | Duchesneau |
| 2017/0262202 A1 | 9/2017 | Seo |
| 2018/0054454 A1 | 2/2018 | Astigarraga et al. |
| 2019/0220315 A1 | 7/2019 | Vallala et al. |
| 2020/0034560 A1 | 1/2020 | Natanzon et al. |
| 2020/0326871 A1 | 10/2020 | Wu et al. |
| 2021/0360833 A1 | 11/2021 | Alissa et al. |

OTHER PUBLICATIONS

Stalzer M.A., "FlashBlades: System Architecture and Applications," Proceedings of the 2nd Workshop on Architectures and Systems for Big Data, Association for Computing Machinery, New York, NY, 2012, pp. 10-14.

Storer M.W., et al., "Pergamum: Replacing Tape with Energy Efficient, Reliable, Disk-Based Archival Storage," 6th USENIX Conference on File And Storage Technologies (FAST'08), San Jose, CA, USA, Feb. 26-29, 2008, 16 Pages, ISBN 978-1-931971-56-0, XP002665467.

COMBINING MEMORY ALIGNED OPERATIONS

CROSS-REFERENCE TO RELATED APPLICATIONS

This is a continuation application for patent entitled to a filing date and claiming the benefit of earlier-filed U.S. Pat. No. 11,836,357, issued Dec. 5, 2023, herein incorporated by reference in its entirety, which is a continuation of U.S. Pat. No. 11,422,714, issued Aug. 23, 2023, which is a continuation of U.S. Pat. No. 10,956,054, issued Mar. 23, 2021, which is a continuation of U.S. Pat. No. 10,268,403, issued Apr. 23, 2019, which is a continuation of U.S. Pat. No. 9,740,414, issued Aug. 22, 2017.

DESCRIPTION OF EMBODIMENTS

Figure 1:
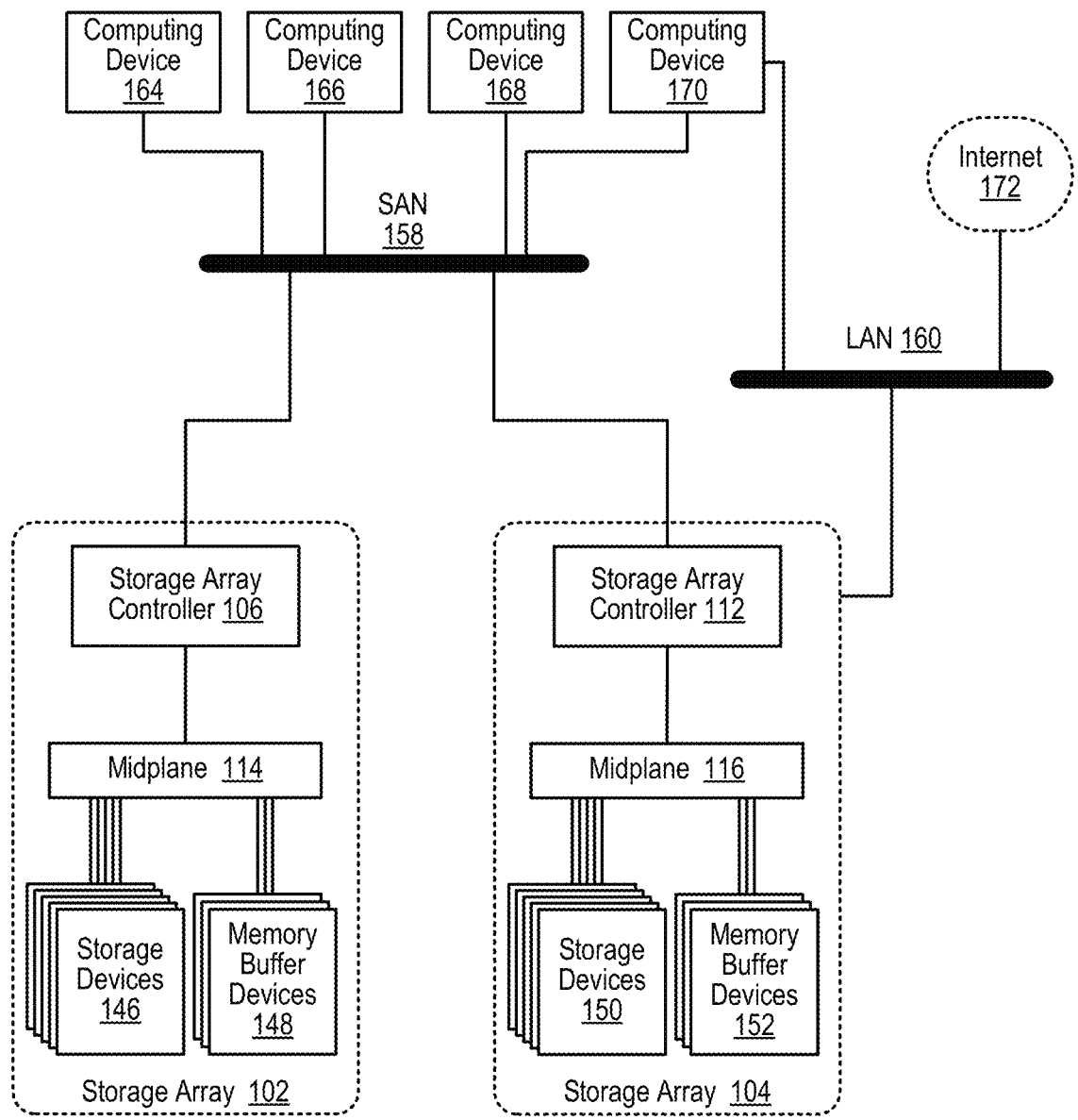
FIG. 1 sets forth a block diagram of an example system configured for optimizing copy operations according to embodiments of the present disclosure.

Example methods, apparatuses, and products for optimizing copy operations in accordance with the present disclosure are described with reference to the accompanying drawings, beginning with FIG. 1. FIG. 1 sets forth a block diagram of a system configured for optimizing copy operations according to embodiments of the present disclosure. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152).

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The storage array controllers (106, 112) of FIG. 1 may be useful in optimizing copy operations according to embodiments of the present disclosure. The storage array controllers (106, 112) may assist in optimizing copy operations by receiving a plurality of copy operations, detecting a triggering event that causes the storage array controller to initiate execution of the plurality of copy operations, combining the plurality of copy operations into a single copy operation, initiating execution of the single copy operation, and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Optimizing copy operations in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in optimizing copy operations according to embodiments of the present disclosure.

Figure 2:
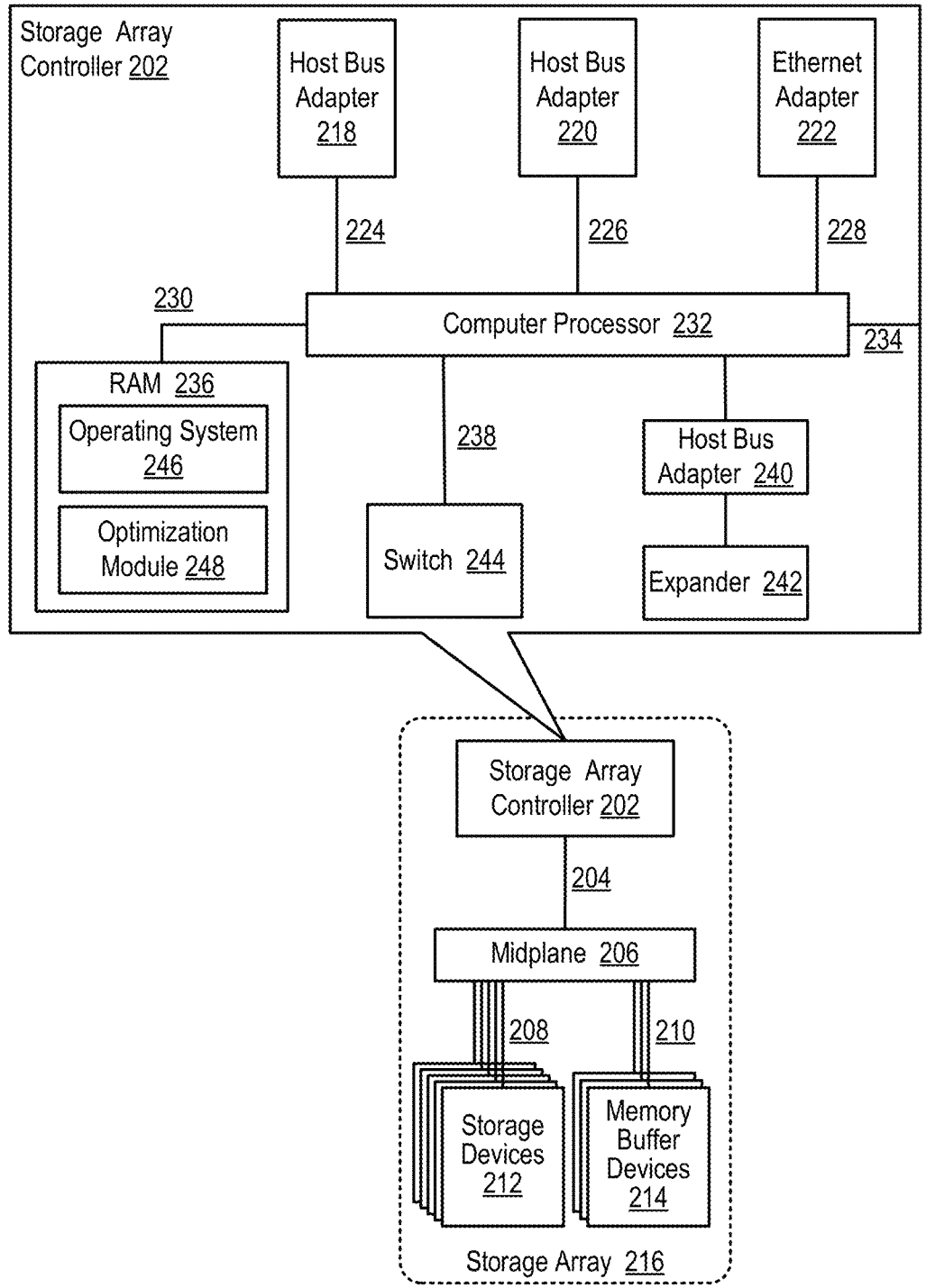
FIG. 2 sets forth a block diagram of an example storage array controller useful in optimizing copy operations according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for optimizing copy operations according to embodiments of the present disclosure include UNIX™, Linux™, Microsoft Windows™, and others as will occur to those of skill in the art. Also stored in RAM (236) is an optimization module (248), a module that includes computer program instructions useful in optimizing copy operations according to embodiments of the present disclosure.

The optimization module (248) of FIG. 2 may be configured to optimize copy operations by receiving a plurality of copy operations. The copy operations may be included in a stream of virtual copy operations. Such virtual copy operations may be embodied, for example, as operations configured to copy virtualized storage (e.g., virtual disks, virtual volumes) from one location to another location within a storage array or even between multiple storage arrays. Such virtual copy operations may be received as a stream where new, incoming virtual copy operations are received at regular intervals, irregular intervals, or any combination thereof. The plurality of copy operations may be embodied, for example, as a plurality of extended copy ('XCOPY') operations, as a plurality of offloaded data transfers ('ODX') operations, as a combination of different types of operations, and so on.

The optimization module (248) of FIG. 2 may be further configured to optimize copy operations by detecting a triggering event that causes the storage array controller (202) to initiate execution of the plurality of copy operations. A triggering event can represent an event whose occurrence causes the storage array controller (202) to initiate the execution of one or more of the copy operations received by the storage array controller (202). Such triggering events may include, for example, the number of copy operations that have been received but not processed exceeding a predetermined threshold, the amount of time since a copy operation has been received but not processed exceeding a predetermined threshold, the amount of time since one or more of the copy operations have been received but not processed exceeding a predetermined threshold, the storage array controller (202) receiving a request to write data to a storage location that is identified in one or more of the copy operations as being an area of storage that is to be copied, and so on.

The optimization module (248) of FIG. 2 may be further configured to optimize copy operations by combining the plurality of copy operations into a single copy operation. Combining the plurality of copy operations into a single copy operation may be carried out, for example, by creating a new copy operation whose parameters capture all storage locations that were identified for copying in the plurality of copy operations. Consider an example in which a first copy operation included a request to copy the first 16 GB of the address space in a particular storage device, a second copy operation included a request to copy the second 16 GB of the address space in the same storage device, and a third copy operation included a request to copy the third 16 GB of the address space in the same storage device. In such an example, combining the plurality of copy operations into the single copy operation may be carried out by creating a new copy operation and specifying the first 48 GB of the address space in the storage device as the area of storage that is to be copied.

The optimization module (248) of FIG. 2 may be further configured to optimize copy operations by initiating execution of the single copy operation. The storage array controller (202) of FIG. 2 may initiate execution of the single copy operation, for example, by sending the single copy operation to a particular storage device from which data is to be copied.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller)

to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
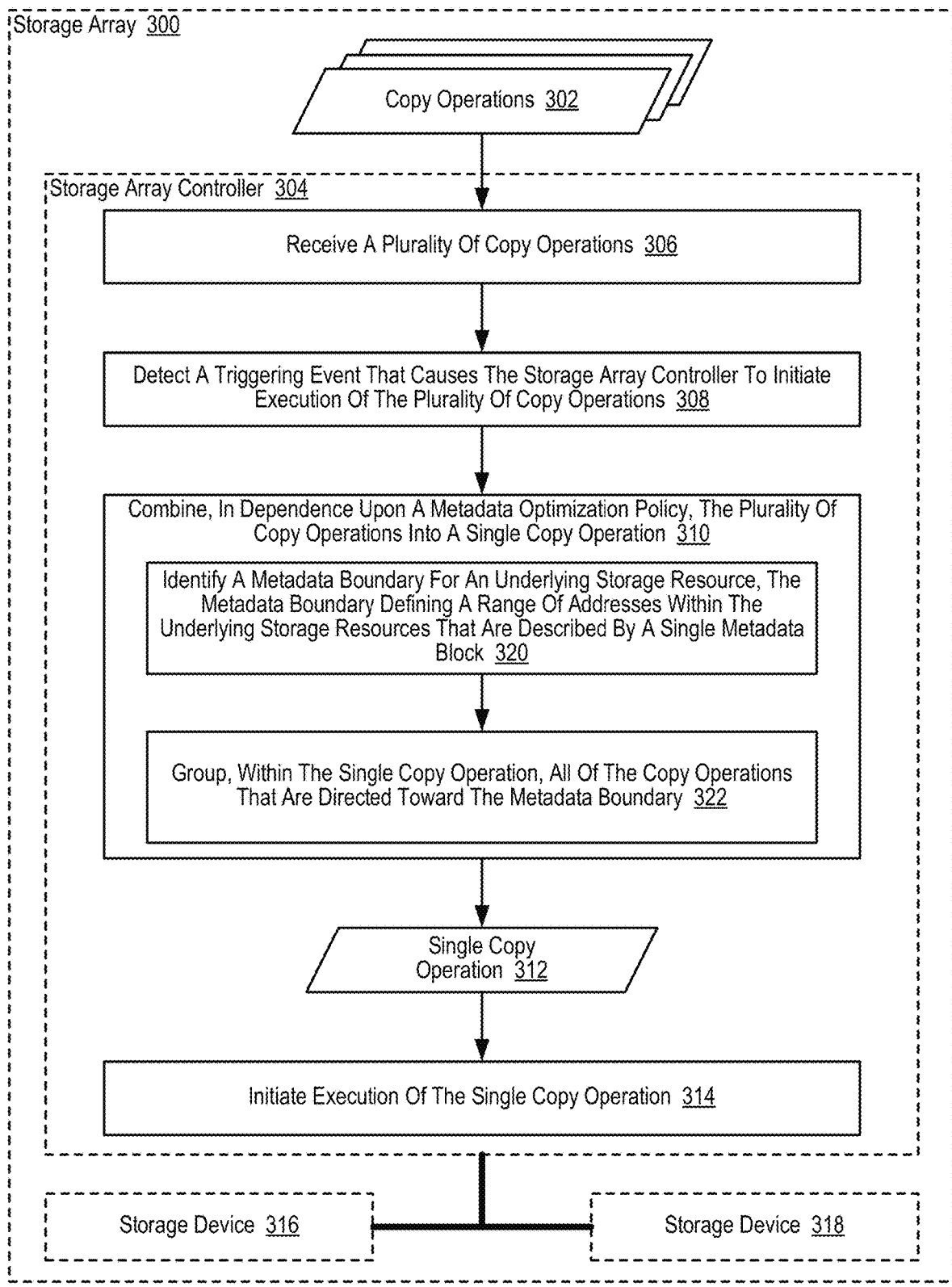
FIG. 3 sets forth a flow chart illustrating an example method for optimizing copy operations according to embodiments of the present disclosure.

For further explanation, FIG. 3 sets forth a flow chart illustrating an example method for optimizing copy operations according to embodiments of the present disclosure. The example method depicted in FIG. 3 includes a storage array (300). The storage array (300) depicted in FIG. 3 can include a plurality of storage devices and a storage array controller (304) that is coupled for data communications to the storage devices (316, 318). Although not depicted in similar detail, readers will appreciate that the storage array (300) depicted in FIG. 3 may be similar to the storage arrays described above with reference to FIG. 1. The example method depicted in FIG. 3 may be carried out, at least in part, by a storage array controller (304) that is similar to the storage array controllers described above with reference to FIG. 1 and FIG. 2.

The example method depicted in FIG. 3 includes receiving (306) a plurality of copy operations (302). The copy operations (302) depicted in FIG. 3 may be included in a stream of virtual copy operations. Such virtual copy operations may be embodied, for example, as operations configured to copy virtualized storage (e.g., virtual disks, virtual volumes) from one location to another location within a storage array or even between multiple storage arrays. Such virtual copy operations may be received as a stream where new, incoming virtual copy operations are received at regular intervals, irregular intervals, or any combination thereof.

The plurality of copy operations (302) may be embodied, for example, as a plurality of XCOPY operations, as a plurality of ODX operations, as a combination of different types of operations, and so on.

The example method depicted in FIG. 3 also includes detecting (308) a triggering event that causes the storage array controller (304) to initiate execution of the plurality of copy operations. A triggering event can represent an event whose occurrence causes the storage array controller (304) to initiate the execution of one or more of the copy operations (302) received by the storage array controller (304). Such triggering events may include, for example, the number of copy operations (302) that have been received (306) but not processed exceeding a predetermined threshold, the amount of time since a copy operation (302) has been received (306) but not processed exceeding a predetermined threshold, the amount of time since one or more of the copy operations (302) have been received (306) but not processed exceeding a predetermined threshold, the storage array controller (304) receiving a request to write data to a storage location that is identified in one or more of the copy operations (302) as being an area of storage that is to be copied, and so on.

The example method depicted in FIG. 3 also includes combining (310) the plurality of copy operations (302) into a single copy operation (312). Combining (310) the plurality of copy operations (302) into a single copy operation (312) may be carried out, for example, by creating a new copy operation having parameters that capture all storage locations that were identified for copying in the plurality of copy operations (302). Consider an example in which a first copy operation included a request to copy the first 16 GB of the address space in a particular storage device, a second copy operation included a request to copy the second 16 GB of the address space in the same storage device, and a third copy operation included a request to copy the third 16 GB of the address space in the same storage device. In such an example, combining (310) the plurality of copy operations (302) into the single copy operation (312) may be carried out by creating a new copy operation and specifying the first 48 GB of the address space in the storage device as the area of storage that is to be copied.

In the example method depicted in FIG. 3, the plurality of copy operations (302) are combined (310) into a single copy operation in dependence upon a metadata optimization policy. The metadata optimization policy may be embodied as one or more rules utilized to determine, for example, which copy operations (302) are combined (310) into a single copy operation (312), the order in which the copy operations (302) are to be combined (310) into the single copy operation (312), and so on. Such a metadata optimization policy may be structured in such a way that copy operations are selected for inclusion within the single copy operation (312) and ordered in such a way within the single copy operation (312) that causes, for example, the least amount of metadata to be stored in the storage array (300), the least amount of metadata to be read or written during the execution of the single copy operation (312), and so on.

Consider an example in which each of the storage devices (316, 318) depicted in FIG. 3 are logically broken up into 1 MB chucks. Further assume that each 1 MB chunk is described by metadata that maps, for example, a logical address for some data stored within the 1 MB chuck to a physical address of the data. In such an example, assume that a plurality of copy operations (302) are issued to copy data stored on the first storage device (316) to the second storage device (318). If the copy operations are combined such that executing the resultant single copy operation (312) would cause data to be read from a first 1 MB chunk and also cause data to be read from a second 1 MB chunk, as part of executing the resultant single copy operation (312), all metadata for the first 1 MB chunk may be read and all metadata for the second 1 MB chunk may also be read. By contrast, if the copy operations are combined such that executing the resultant single copy operation (312) would cause data to be read from only a single 1 MB chunk, metadata for only the single 1 MB chunk would need to be read. As such, in order to minimize the amount of metadata that is read or written during the execution of the single copy operation (312), the metadata optimization policy may be configured such that only copy operations directed to the same underlying chunk can be combined into a single copy operation (312).

In the example method depicted in FIG. 3, combining (310) the plurality of copy operations (302) into a single copy operation (312) in dependence upon a metadata optimization policy can include identifying (320) a metadata boundary for an underlying storage resource. Such a metadata boundary can define a range of addresses within the underlying storage resource that are described by a single metadata block. The underlying storage resource may be embodied, for example, as a storage device (316, 318) in a storage array (300). In such an example, the storage array controller (304) may identify (320) a metadata boundary for an underlying storage resource by querying the underlying storage resource, by examining system configuration information that includes information describing the underlying storage resource, and so on.

In the example method depicted in FIG. 3, combining (310) the plurality of copy operations (302) into a single copy operation (312) in dependence upon a metadata optimization policy can also include grouping (322), within the single copy operation (312), all of the copy operations (302) that are directed toward the metadata boundary. The copy operations (302) that are directed toward the metadata boundary can include any copy operation that reads data from or writes data to a range of addresses within the underlying storage resource that are described by a single metadata block.

Readers will appreciate that although the steps described above results in only a single copy operation (312) being generated, the steps described above may be repeated, so that multiple copy operations may be created. For example, a first set of copy operations (302) may be received (306) and ultimately combined (310) into a first single copy operation (312) and a second set of copy operations (302) may also be received (306) and ultimately combined (310) into a second single copy operation (312). In such an example, because copy operations can be combined (310) by identifying (320) metadata boundaries and grouping (322) all of the copy operations (302) that are directed towards a single metadata boundary, the first single copy operation (312) and the second single copy operation (312) would be constructed in a way where the first single copy operation (312) and the second single copy operation (312) do not both include copy operations that are directed to the same metadata boundary.

Readers will further appreciate that although steps 320 and 322 result in only identifying (320) only a single metadata boundary and grouping (322) all of the copy operations directed toward that single metadata boundary, steps 320 and 322 may be repeated as a part of combining (310) the plurality of copy operations (302) into a single copy operation (312). For example, combining (310) the plurality of copy operations (302) into a single copy operation (312) may include identifying (320) a first metadata boundary and grouping (322) all of the copy operations directed toward the first metadata boundary into the single copy operation (312), identifying (320) a second metadata boundary and grouping (322) all of the copy operations directed toward the second metadata boundary into the single copy operation (312), identifying (320) a third metadata boundary and grouping (322) all of the copy operations directed toward the third metadata boundary into the single copy operation (312), and so on. In such a way, a particular instance of a single copy operation (312) may span many metadata boundaries but, as described above, two instances of the single copy operation (312) would not both include copy operations that are directed to the same metadata boundary.

The example method depicted in FIG. 3 also includes initiating (314) execution of the single copy operation (312). The storage array controller (304) of FIG. 3 may initiate (314) execution of the single copy operation (312), for example, by sending the single copy operation (312) to a particular storage device from which data is to be copied.

Figure 4:
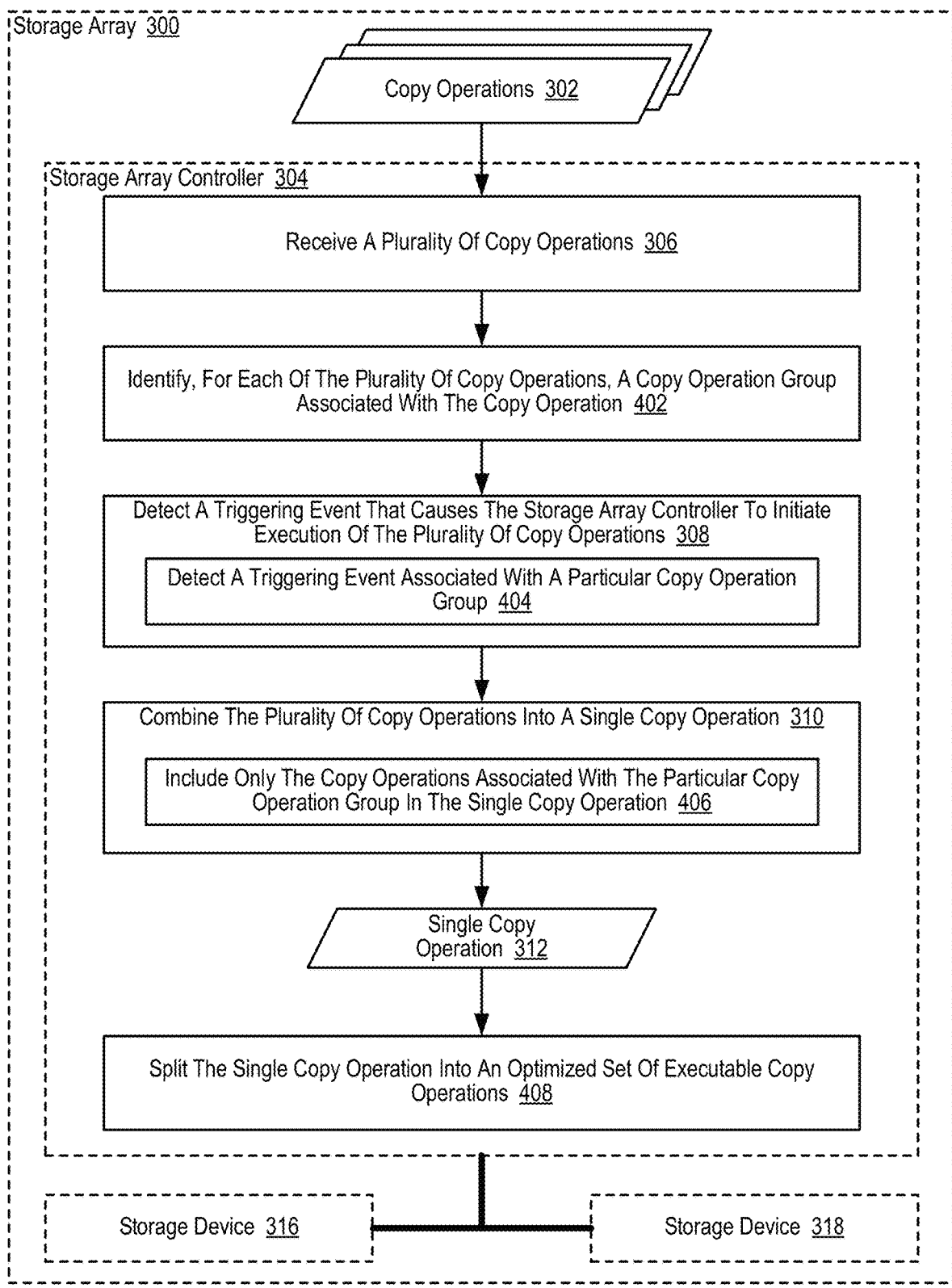
FIG. 4 sets forth a flow chart illustrating an additional example method for optimizing copy operations according to embodiments of the present disclosure.

For further explanation, FIG. 4 sets forth a flow chart illustrating an example method for optimizing copy operations according to embodiments of the present disclosure. The example method depicted in FIG. 4 is similar to the example method depicted in FIG. 3, as the example method depicted in FIG. 4 also includes receiving (306) a plurality of copy operations (302), detecting (308) a triggering event that causes the storage array controller (304) to initiate execution of the plurality of copy operations, and combining (310) the plurality of copy operations (302) into a single copy operation (312).

The example method depicted in FIG. 4 also includes identifying (402) a copy operation group associated with the copy operation. Identifying (402) a copy operation group associated with the copy operation may be carried out for each of the plurality of copy operations (302) or for only a subset of the copy operations (302). Each of the copy operation groups may represent, for example, different streams of copy operations issued by different actors (e.g., different software applications, different users, different hardware systems, and so on). Although different actors may initiate a stream of copy operations, the storage array controller (304) may be configured to only optimize copy operations from a subset of such actors. As such, each copy operation may include information that identifies the copy operation group that the copy operation belongs to, each copy operation issued by a particular actor may be associated with a particular copy operation group, or copy operations may be otherwise associated with a particular copy operation group such that the storage array controller (304) may identify (402) a copy operation group associated with the copy operation.

In the example method depicted in FIG. 4, detecting (308) the triggering event can include detecting (404) a triggering event associated with a particular copy operation group. A triggering event can represent an event whose occurrence causes the storage array controller (304) to initiate the execution of one or more of the copy operations (302) received by the storage array controller (304). Such triggering events may include, for example, the number of copy operations (302) that are associated with a particular copy operation group and that have been received (306) but not processed has reached a predetermined number, the amount of time since a copy operation (302) that is associated with a particular copy operation group has been received (306)

but not processed has reached a predetermined amount of time, the amount of time since one or more of the copy operations (302) that are associated with a particular copy operation group have been received (306) but not processed has reached a predetermined amount of time, the storage array controller (304) receiving a request to write data to a storage location that is identified in one or more of the copy operations (302) as being an area of storage that is to be copied, and so on.

In the example method depicted in FIG. 4, combining (310) the plurality of copy operations (302) into a single copy operation (312) can be carried out by including (406) only the copy operations associated with the particular copy operation group in the single copy operation (312). Including (406) only the copy operations associated with the particular copy operation group in the single copy operation (312) may be carried out, for example, by creating a new copy operation having parameters that capture all storage locations that were identified for copying in the plurality of copy operations (302) that are associated with the particular copy operation group.

The example method depicted in FIG. 4 also includes splitting (408) the single copy operation (312) into an optimized set of executable copy operations. An optimal copy operation may be embodied, for example, as a copy operation that copies a particular amount of data (e.g., a block of data) that aligns with the physical or logical layout of memory on the storage device that data is copied from, as a copy operation that writes a particular amount of data (e.g., a block of data) that aligns with the physical or logical layout of memory on the storage device that data is written to, as an amount of data optimized for transmission across a network, and so on. As such, the single copy operation (312) may be split (408) into an optimized set of executable copy operations by splitting the single copy operation (312) into a set of optimal copy operations.

Figure 5:
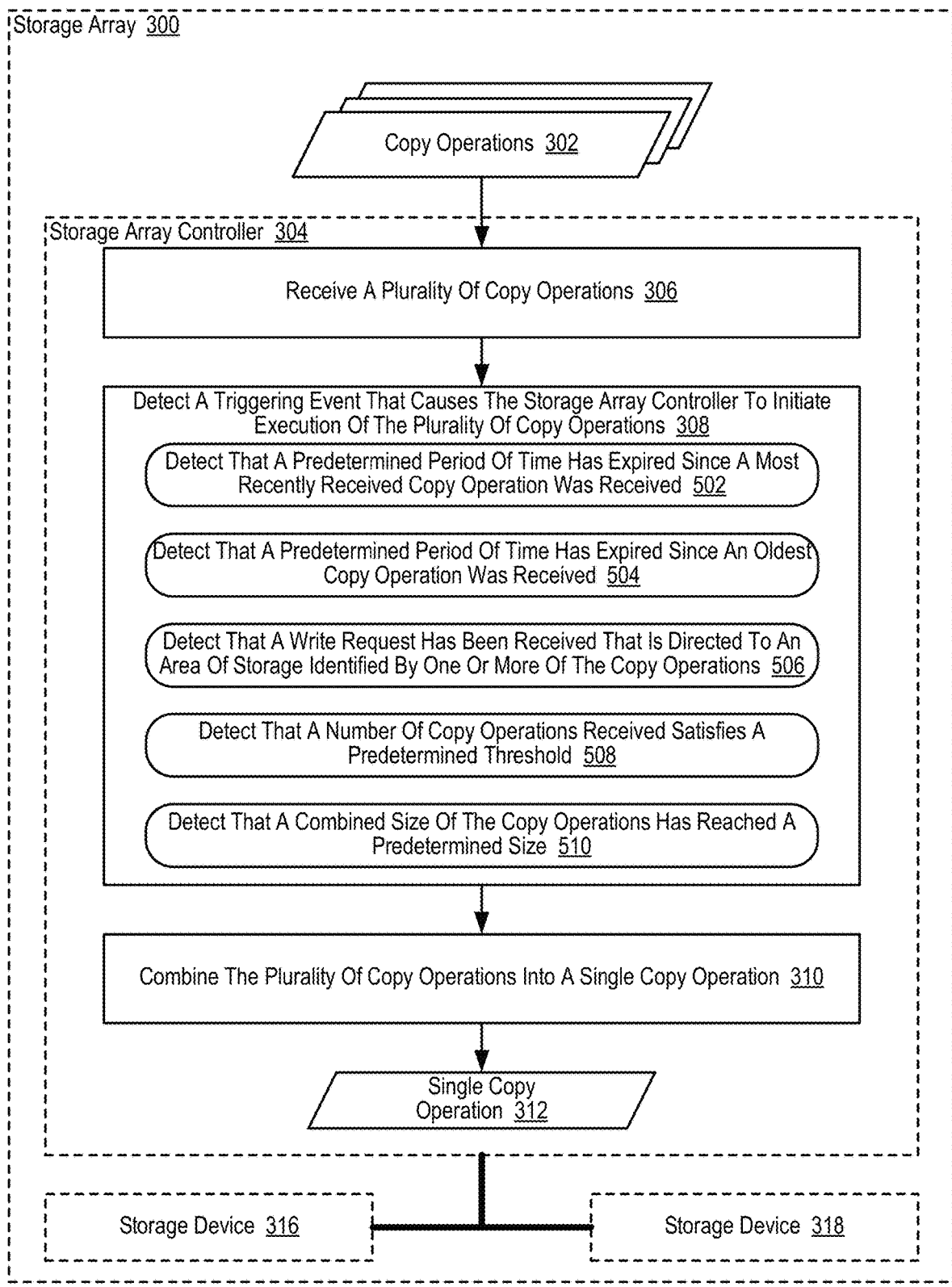
FIG. 5 sets forth a flow chart illustrating an additional example method for optimizing copy operations according to embodiments of the present disclosure.

For further explanation, FIG. 5 sets forth a flow chart illustrating an example method for optimizing copy operations according to embodiments of the present disclosure. The example method depicted in FIG. 5 is similar to the example method depicted in FIG. 3, as the example method depicted in FIG. 5 also includes receiving (306) a plurality of copy operations (302), detecting (308) a triggering event that causes the storage array controller (304) to initiate execution of the plurality of copy operations, and combining (310) the plurality of copy operations (302) into a single copy operation (312).

In the example method depicted in FIG. 5, detecting (308) a triggering event that causes the storage array controller (304) to initiate execution of the plurality of copy operations (302) can include detecting (502) that a predetermined period of time has expired since a most recently received copy operation was received. In the example method depicted in FIG. 5, when the storage array controller (304) ceases receiving copy operations (302) for a predetermined period of time, the storage array controller (304) may assume that all parts of a larger copy operation have been received. As such, the storage array controller (304) may cease optimizing the copy operations and may proceed to combine (310) the plurality of copy operations (302) into a single copy operation (312) and initiate (314) execution of the single copy operation (312).

In the example method depicted in FIG. 5, detecting (502) that a predetermined period of time has expired since a most recently received copy operation was received may be carried out, for example, through the use of a timer that resets every time a copy operation is received (306). Although the example method depicted in FIG. 5 describes the storage array controller (304) detecting (502) that a predetermined period of time has expired since a most recently received copy operation was received, readers will appreciate that the storage array controller (304) may utilize other criteria to determine that an incoming flow of copy operations has ceased. For example, rather than detecting (502) that a predetermined period of time has expired since a most recently received copy operation was received, the storage array controller (304) may track the number of read/write requests that have been received since a most recently received copy operation was received, the storage array controller (304) may track the number of copy operations associated with other copy operation groups that have been received since a most recently received copy operation associated with a particular copy operation group was received, and so on.

In the example method depicted in FIG. 5, detecting (308) a triggering event that causes the storage array controller (304) to initiate execution of the plurality of copy operations can include detecting (504) that a predetermined period of time has expired since an oldest copy operation was received. In the example method depicted in FIG. 5, the storage array controller (304) may be configured to limit the time that the storage array controller (304) can hold a particular copy operation. As such, the storage array controller (304) may cease optimizing the copy operations and may proceed to combine (310) the plurality of copy operations (302) into a single copy operation (312) and initiate (314) execution of the single copy operation (312) upon detecting (504) that the predetermined period of time has expired since an oldest copy operation was received.

In the example method depicted in FIG. 5, detecting (504) that the predetermined period of time has expired since an oldest copy operation was received may be carried out, for example, through the use of a timer and/or timestamps associated with each received copy operation. Although the example method depicted in FIG. 5 describes the storage array controller (304) detecting (504) that the predetermined period of time has expired since an oldest copy operation was received, readers will appreciate that the storage array controller (304) may utilize other criteria to determine that a pending copy operation should move forward with processing. For example, rather than detecting (504) that the predetermined period of time has expired since an oldest copy operation was received, the storage array controller (304) may track the number of read/write requests that have been received since an oldest copy operation was received, the storage array controller (304) may track the number of copy operations associated with other copy operation groups that have been received since an oldest copy operation associated with a particular copy operation group was received, and so on.

In the example method depicted in FIG. 5, detecting (308) a triggering event that causes the storage array controller (304) to initiate execution of the plurality of copy operations can include detecting (506) that a write request has been received that is directed to an area of storage identified by one or more of the copy operations. As described above, a particular copy operation can represent a request to copy data contained in one area of computer storage to another area of computer storage, where the areas need not be contiguous memory regions. In such an example, when a write request has been received that is directed to an area of storage identified by one or more of the copy operations, the copy operation should be performed before executing the write operation, to ensure that the data that is copied and written as part of the copy operation is the same data that was requested to be copied and written when the copy operation was issued. As such, once the storage array controller (304) detects (506) that a write request has been received that is directed to an area of storage identified by one or more of the copy operations, the storage array controller (304) may cease optimizing the copy operations and may proceed to combine (310) the plurality of copy operations (302) into a single copy operation (312) and initiate (314) execution of the single copy operation (312), thus reducing delay in servicing the write request. Readers will appreciate that read requests may be processed immediately, however, as a read request will not impact the data that is copied and written as part of the copy operation.

In the example method depicted in FIG. 5, detecting (308) a triggering event that causes the storage array controller (304) to initiate execution of the plurality of copy operations can include detecting (508) that a number of copy operations received has reached a predetermined number. The storage array controller (504) depicted in FIG. 5 may be configured to only optimize a predetermined number of copy operations before combining (310) the plurality of copy operations (302) into a single copy operation (312) and initiating (314) execution of the single copy operation (312). As such, the storage array controller (304) may be configured to detect (508) that a number of copy operations received has reached a predetermined number through the use of one or more counters that is incremented, decremented, or otherwise altered as each copy operation is received.

In the example method depicted in FIG. 5, detecting (308) a triggering event that causes the storage array controller (304) to initiate execution of the plurality of copy operations can alternatively include detecting (510) that a combined size of the copy operations has reached a predetermined size. The predetermined size may be selected, for example, based on the physical or logical layout of memory on the storage devices, based on network bandwidth constraints, based upon constraints associated with the storage array controller (304), based on desired performance characteristics, and so on. Detecting (510) that a combined size of the copy operations has reached a predetermined size may be carried out, for example, by determining the size of each copy operation that has been received and keeping a running sum of the collective size of copy operations that have been received.

Example embodiments of the present disclosure are described largely in the context of a fully functional computer system. Readers of skill in the art will recognize, however, that the present disclosure also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
  combining, into a single operation, a plurality of operations based on a metadata boundary at an underlying storage resource that defines a range of addresses of a single metadata block; and
  from the single operation, creating an optimized set of one or more executable operations that write a particular amount of data that aligns with a memory layout at a target storage location.

2. The method of claim 1 wherein combining, in dependence upon a metadata optimization policy, the plurality of operations into a single operation further comprises:
  identifying a metadata boundary for an underlying storage resource, the metadata boundary defining a range of addresses within underlying storage resources that are described by a single metadata block; and
  grouping, within the single operation, all operations that are directed toward the metadata boundary.

3. The method of claim 1 wherein splitting the single operation into an optimized set of executable copy operations further comprises splitting the single operation into one or more copy operations that copy a particular amount of data that aligns with a physical or logical layout of memory on a storage device that data is copied from.

4. The method of claim 1 further comprising:
  identifying a copy operation group associated with the single operation, wherein:
  detecting a triggering event associated with a particular copy operation group; and
  combining the plurality of operations into the single operation further comprises including only operations associated with the particular copy operation group in the single operation.

5. The method of claim 1, wherein the plurality of operations are copy operations.

6. The method of claim 1 wherein splitting the single operation into an optimized set of executable copy operations further comprises splitting the single operation into one or more copy operations that write an amount of data optimized for transmission across a network.

7. The method of claim 1 wherein the single operation is a virtual copy operation.

8. The method of claim 1 further comprising detecting, as a triggering event, that a number of copy operations received has reached a predetermined number.

9. The method of claim 1 further comprising, detecting, as a triggering event, that a combined size of the plurality of operations has reached a predetermined size threshold.

10. A storage array controller, the storage array controller including a computer processor and a computer memory, the computer memory including computer program instructions that, when executed, cause the storage array controller to carry out the steps of:
  combining, into a single operation, a plurality of operations based on a metadata boundary at an underlying storage resource that defines a range of addresses of a single metadata block; and from the single operation, creating an optimized set of one or more executable operations that write a particular amount of data that aligns with a memory layout at a target storage location.

11. The storage array controller of claim 10 wherein combining, in dependence upon a metadata optimization policy, the plurality of operations into a single operation further comprises:
identifying a metadata boundary for an underlying storage resource, the metadata boundary defining a range of addresses within underlying storage resources that are described by a single metadata block; and
grouping, within the single operation, all of the operations that are directed toward the metadata boundary.

12. The storage array controller of claim 10 wherein splitting the single operation into an optimized set of executable copy operations further comprises splitting the single operation into one or more copy operations that copy a particular amount of data that aligns with a physical or logical layout of memory on a storage device that data is copied from.

13. The storage array controller of claim 10 further comprising computer program instructions that, when executed, cause the storage array controller to carry out the steps of:
identifying a copy operation group associated with the single operation;
detecting a triggering event associated with a particular copy operation group; and
combining the plurality of operations into the single operation further comprises including only operations associated with the particular copy operation group in the single operation.

14. The storage array controller of claim 10 further comprising computer program instructions that carry out the step of detecting, as a triggering event, that a predetermined period of time has expired since a most recently received copy operation was received.

15. The storage array controller of claim 10 further comprising computer program instructions that carry out the step of detecting, as a triggering event, that a predetermined period of time has expired since an oldest copy operation was received.

16. The storage array controller of claim 10, wherein the plurality of operations are copy operations.

17. The storage array controller of claim 10 wherein splitting the single operation into an optimized set of executable copy operations further comprises splitting the single operation into one or more copy operations that write an amount of data optimized for transmission across a network.

18. The storage array controller of claim 10 wherein the single operation is a virtual copy operation.

19. A computer program product, the computer program product disposed on a computer readable storage medium, the computer program product comprising computer program instructions that, when executed, cause a storage device to carry out the steps of:
combining, in dependence upon a metadata optimization policy, a plurality of operations into a single operation; and
splitting the single operation into an optimized set of one or more executable copy operations that write a particular amount of data that aligns with a physical or logical layout of memory at a target storage location.

20. The computer program product of claim 19 wherein combining, in dependence upon a metadata optimization policy, the plurality of operations into a single operation further comprises:
identifying a metadata boundary for an underlying storage resource, the metadata boundary defining a range of addresses within underlying storage resources that are described by a single metadata block; and
grouping, within the single operation, all operations that are directed toward the metadata boundary.

* * * * *